(12) United States Patent
Ogawa et al.

(10) Patent No.: US 11,435,646 B2
(45) Date of Patent: Sep. 6, 2022

(54) LASER DEVICE

(71) Applicant: NICHIA CORPORATION, Anan (JP)

(72) Inventors: Hisashi Ogawa, Yokohama (JP);
Masayuki Katsuragawa, Hachioji (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/486,917

(22) Filed: Sep. 28, 2021

(65) Prior Publication Data
US 2022/0121083 A1 Apr. 21, 2022

(30) Foreign Application Priority Data
Oct. 16, 2020 (JP) .............................. JP2020-174824

(51) Int. Cl.
*G02F 1/35* (2006.01)

(52) U.S. Cl.
CPC ................................. *G02F 1/3503* (2021.01)

(58) Field of Classification Search
CPC ...................................................... G02F 1/3503
See application file for complete search history.

(56) References Cited

U.S. PATENT DOCUMENTS

| 5,289,491 | A | 2/1994 | Dixon | |
| 6,317,449 | B1 * | 11/2001 | Zanger | G02F 1/37 372/100 |
| 6,633,595 | B1 * | 10/2003 | Gries | G02F 1/37 372/98 |
| 8,902,939 | B2 | 12/2014 | Kafka et al. | |
| 9,419,559 | B2 * | 8/2016 | Morgner | H03B 17/00 |
| 9,857,659 | B2 | 1/2018 | Katsuragawa | |
| 2002/0093996 | A1 * | 7/2002 | Liu | G02F 1/3501 372/28 |

FOREIGN PATENT DOCUMENTS

| EP | 2466372 A1 * | 6/2012 | .......... G02F 1/3501 |
| JP | 07-507882 | 8/1995 | |
| JP | 2013-518302 | 5/2013 | |
| JP | 2016-065871 | 4/2016 | |
| JP | 2018-087990 | 6/2018 | |
| JP | 2019-164363 | 9/2019 | |
| JP | 6628287 B2 | 1/2020 | |
| WO | WO-2015091353 A1 * | 6/2015 | .......... G02F 1/3501 |
| WO | WO 2015/170780 | 11/2015 | |
| WO | WO-2017002472 A1 * | 1/2017 | .............. G02F 1/39 |

OTHER PUBLICATIONS

Pearl et al., "Optimization of Laser Intracavity Second-Harmonic Generation by a Linear Dispersion Element", J. Opt. Soc. Am. B, vol. 16, No. 10, Oct. 1999, pp. 1705-1711 (Year: 1999).*

* cited by examiner

*Primary Examiner* — Daniel Petkovsek
(74) *Attorney, Agent, or Firm* — Mori & Ward, LLP

(57) ABSTRACT

A laser device includes a light source configured to emit a laser light, a first mirror and a second mirror constituting a resonator where a laser light emitted from the light source enters, a nonlinear optical medium located between the first mirror and the second mirror, and a dispersive medium of adjustable effective optical thickness located between the nonlinear optical medium and at least one of the first mirror and the second mirror.

20 Claims, 6 Drawing Sheets

LASER DEVICE

CROSS-REFERENCE TO RELATED PATENT APPLICATIONS

The present application claims priority under 35 U.S.C. § 119 to Japanese Patent Application No. 2020-174824, filed on Oct. 16, 2020. The contents of this application are incorporated herein by reference in their entirety.

BACKGROUND OF THE INVENTION

Field of the Invention

The present document relates to a laser device.

Discussion of the Background

Wavelength conversion using nonlinear optical processes is particularly useful for generating light in wavelength ranges where direct laser oscillation is difficult to obtain. In general, nonlinear optical processes occur when very strong light interacts with a substance, and are well known for second harmonic generation (SHG) and third harmonic generation (THG).

A structure configured to allow adjusting a position in an optical axis direction or an effective thickness of a dispersive medium such that the relative phase relationships between all the frequency components contained in the incident laser light and the emitted laser light that involve the nonlinear optical phenomenon satisfy a desired relationship, in a progress of a nonlinear optical phenomenon (for example, Japanese Patent Publication No. 6628287).

SUMMARY OF THE INVENTION

Nonlinear optical processes generally require high peak intensities. High pulse energy or very short pulse width required to produce a nonlinear optical phenomenon is hindering its application to various industrial applications.

A laser device is described herein that realizes, with small pulse energies, nonlinear optical phenomena or nonlinear optical processes equivalent to that which can be obtained by high-pulse-energy beams.

A laser device according to one embodiment described herein includes a light source configured to emit a laser light, a first mirror and a second mirror constituting a resonator where the laser light emitted from the light source enters, a nonlinear optical medium located between the first mirror and the second mirror, and a dispersive medium of adjustable effective optical thickness located between the nonlinear optical medium and at least one of the first mirror and the second mirror.

The configuration described above can provide a laser device that realizes, with small pulse energies, nonlinear optical phenomena or nonlinear optical processes equivalent to that which can be obtained by high-pulse-energy beams.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
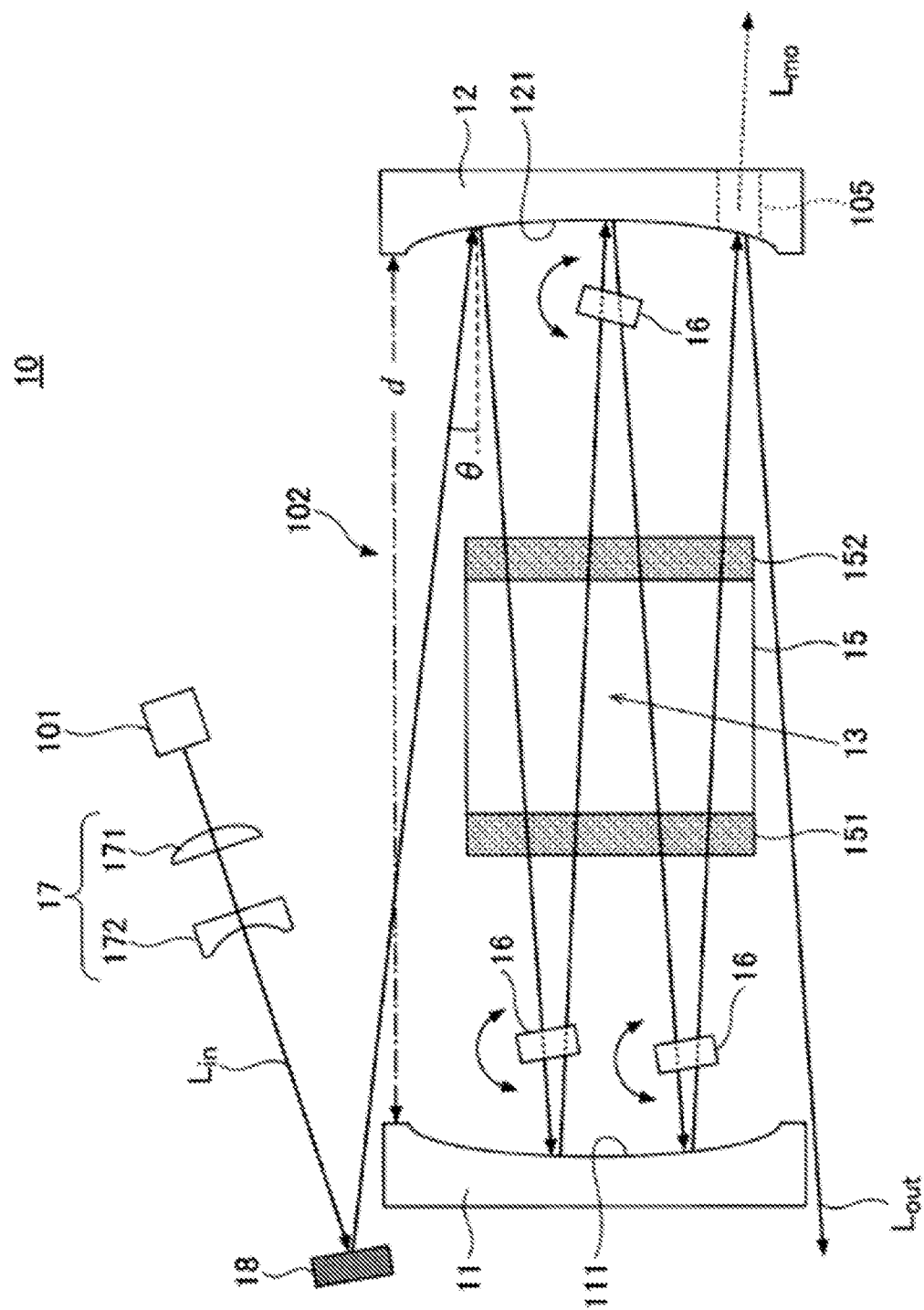
FIG. 1 is a schematic diagram of a laser device according to one embodiment.

The embodiments will now be described with reference to the accompanying drawings, wherein like reference numerals designate corresponding or identical elements throughout the various drawings.

In certain embodiments described herein, a peak intensity of light is increased by focusing a beam diameter of light entering a nonlinear optical medium to increase light density, and the light is folded one or more times within a resonator to increase a length of interaction between the light and a nonlinear optical medium. Further, relative phase relationships among all frequencies involved in a nonlinear optical process are controlled to satisfy a predetermined relationship, in consideration of effects of dispersion that occurs within the resonator. Accordingly, a nonlinear optical phenomenon or a nonlinear optical process equivalent to that which would be caused by a high pulse energy can be realized with a small pulse energy.

FIG. 1 is a schematic plan view of a laser device 10 according to one embodiment. The laser device 10 includes a light source 101 configured to emit a laser beam, a first mirror 11 and a second mirror 12 constituting a resonator 102 where a laser light $L_{in}$ emitted from the light source 101 enters, a nonlinear optical medium 13 located between the first mirror 11 and the second mirror 12, and a dispersive medium 16 of adjustable effective optical thickness located between the nonlinear optical medium 13 and at least one of the first mirror 11 and the second mirror 12. Within the description and scope of claims, the term "effective optical thickness" refers to a value obtained by multiplying a distance (physical length) over which light actually advances by the refractive index of the medium.

The light source 101 is not necessarily configured to generate light of high pulse energy or light of very short pulse width, and any appropriate laser diode that is configured to generate light to be entered into the resonator 102 can be employed. Alternative to the use of the light source 101 such as described above, an optical fiber or the like can be used to cause a laser light $L_{in}$ from the outside to enter the resonator 102.

The positions of the first mirror 11 and the second mirror 12 constituting the resonator 102 can be changed to allow adjustment of the distance d between the two mirrors. As described below, the beam waist diameter, the Rayleigh length, and the interaction length can be varied by changing the distance d between the first mirror 11 and the second mirror 12.

The first mirror 11 and the second mirror 12 are disposed so that when the incident light in the resonator 102 is folded between the two mirrors, the diameter of the incident light is maintained at the mirror surfaces. In other words, the resonator 102 is a stable resonator in which the beam diameter is kept almost constant at the point of folding back, even the light is folded multiple times between the first mirror 11 and the second mirror 12. A nonlinear optical medium 13 is positioned in the stable resonator and an incident light is folded back and forth while tightly focusing the beam waist of the incident light, also, which allows to increase the peak intensity and also to increase an interaction length or Rayleigh length.

The first mirror 11 and the second mirror 12 have a concave surface 111 and a concave surface 121, respectively, each having a predetermined curvature. The beam diameter of the light reflected between the concave surface 111 and the concave surface 121 is focused at a predetermined position between the concave surface 111 and the concave surface 121. The concave surface 111 and the concave surface 121 can be provided with a high-reflectance film. An antireflecting region can be formed on a portion of the high-reflection film on the concave surface 111 or on the concave surface 121 to provide a light-transmitting portion 105 for a monitor light $L_{mo}$. In the present specification, the term "high reflection" refers to a reflection in which equal to or greater than 90% of the incoming light is reflected.

A nonlinear optical medium 13 is disposed between the first mirror 11 and the second mirror 12. In the example configuration shown in FIG. 1, the first mirror 11 and the second mirror 12 are located in the atmosphere, and the non-linear optical medium 13 that is a gaseous medium or a liquid medium is enclosed in a container 15. The non-linear optical medium 13 contained in the container 15 is hydrogen gas, nitrogen gas, noble gas, sulfur hexafluoride (SF6), or the like.

The container 15 has a first light-transmissive part 151 on the surface facing the first mirror 11, and a second light-transmissive part 12 on the surface facing the second mirror 12. The first light-transmissive part 151 and the second light-transmissive part 152 can be formed as a transparent window part of the container 15.

The light that is bouncing back and forth between the first mirror 11 and the second mirror 12 propagates through the first light-transmissive part 151 or the second light-transmissive part 152 through the nonlinear optical medium 13, and then propagates through the second light-transmissive part 152 or the first light-transmissive part 151 and exits from the nonlinear optical medium 13. With the concave surface 111 of the first mirror 11 and the concave surface 121 of the second mirror 12, the beam diameter of the light propagating back and forth is focused at the time of incident within the nonlinear optical medium 13.

Tightly focusing the beam waist within the nonlinear optical medium 13 results in an increase in the light density at the beam waist and higher peak intensity, causing an interaction between the laser light and the nonlinear optical medium 13. Even when light with a small pulse energy is injected into the resonator 102, designing the beam waist to be present in the nonlinear optical medium 13 allows the nonlinear optical phenomenon to occur efficiently.

The dispersive medium 16 is located between the first mirror 11 and the nonlinear optical medium 13 or/and between the second mirror 12 and the nonlinear optical medium 13. The dispersive medium 16 is a medium having a refractive index that is dependent on the frequency or the wavelength of the laser beam, and can be in a state of either a solid, a liquid or a gas.

In the example illustrated in FIG. 1, a plurality of solid dispersive media 16 are arranged in the atmosphere, but alternatively, a gaseous or liquid dispersive medium can be filled in a casing formed from a thin plastic film or optical thin film having a low refractive index. The solid dispersive media 16 can be formed of glass, silicate, calcium fluoride, magnesium fluoride or the like, or a polymer or plastic, such as polyvinyl chloride.

The effective optical thicknesses of the dispersive media 16 can be determined such that the relative phase relationships among all the frequency components involved in the nonlinear optical process are in a desired relationship, taking into account the effects of dispersion that occurs in all the optical paths within the resonator 102. Examples of the effects of dispersion occurred in the resonator 102 include effect(s) of dispersion on light passing through the first light-transmissive part 151 and the second light-transmissive part 152 of the container 15, and the effect(s) of dispersion on light being reflected at the concave surface 111 of the first mirror 11 and the concave surface 121 of the second mirror 12.

The "effective optical thicknesses of the dispersive media 16" refers to values each obtained by multiplying a distance over which light propagates in a corresponding one of the dispersive media 16 by the refractive index, as described above. To allow the distance of light propagating through each of the dispersive media 16 to be adjusted, it is possible to use a combination of, for example, a dispersion plate, a pair of wedge-shaped parts, and an electrooptical modulation element, as the dispersive media 16.

Figure 2A:
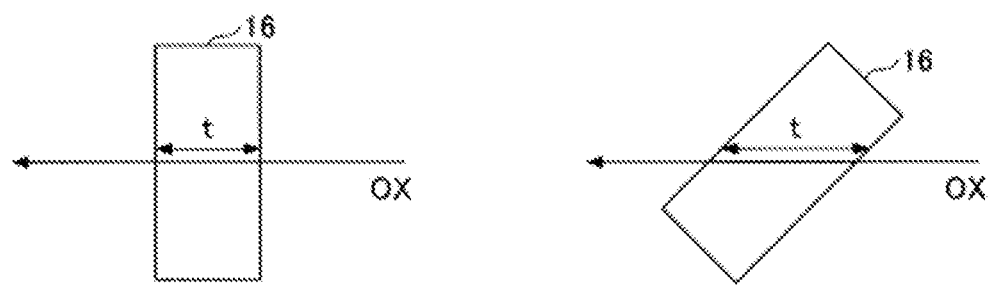
FIG. 2A illustrates an example of adjusting an effective optical thickness of a dispersive medium.
Figure 2B:
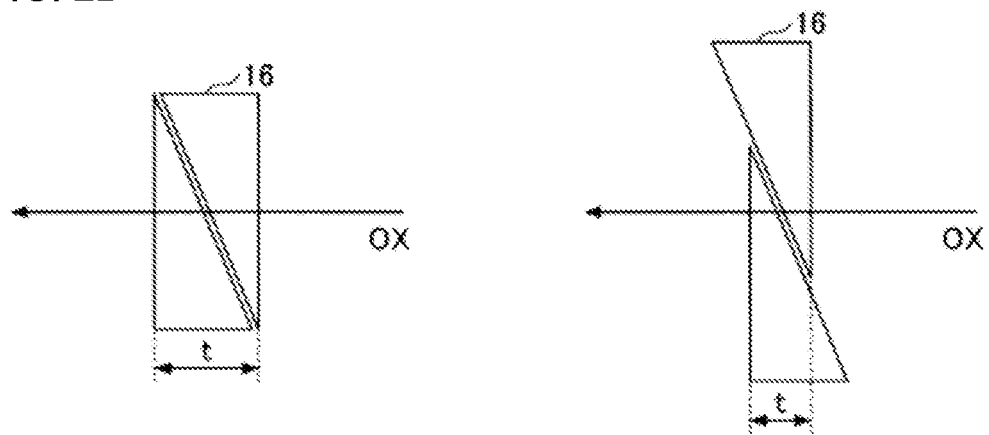
FIG. 2B illustrates an example of adjusting an effective optical thickness of a dispersive medium.

FIG. 2A and FIG. 2B illustrate examples of adjusting the effective optical thicknesses of the dispersive media 16. In FIG. 2A, the effective optical thickness t is changed by tilting the dispersive medium 16 in a plate-shape or a rectangular parallelepiped shape with respect to the optical axis OX. As shown in FIG. 2B, when using the dispersive medium 16 formed by combining a pair of wedge-shaped parts, at least one of the wedge-shaped parts is moved relative to the other, along the edge of the wedge. Accordingly, the positions of the incident surface and the exit surface, and the effective optical thickness t of each of the dispersive media 16 can be adjusted.

The dispersive media 16 that can be rotated relative to the optical axis OX can be singly used as shown in FIG. 1, or a combination with the dispersive medium 16 of wedge-type pairs can be employed. Alternatively, the dispersive media 16 each formed by combining a pair of wedge-shaped parts can be singly used. If the effective optical thicknesses t of the dispersive media 16 can be adjusted, any configuration can be employed.

The positions and the effective optical thicknesses t of the dispersive media 16 are determined such that all the frequency components to be involved in the nonlinear optical process, that is, a plurality of frequency components included in the incident laser light, and one or more frequency components newly generated in the nonlinear optical medium 13 exhibit relative-phase relationship that is a desired relationship at a predetermined length of interaction. More specifically, the positions and the effective optical thicknesses t of the dispersive media 16 are selected (determined) such that all the frequency components satisfy the relative-phase relationships at the incident surface of the nonlinear optical medium 13 and at the outputting surface of the nonlinear optical medium 13, respectively.

At least one of the first optical system 17 and the second optical system 18 can be placed corresponding to the incident side of the resonator 102. The first optical system 17 includes, for example, a lens 171 and a lens 172 and is configured to adjust the lateral mode of the laser light $L_{in}$ entering the resonator 102 to match the lateral mode of the resonator 102. In the present specification, the expression to "match" the lateral mode does not mean that the beam waist diameter and the Rayleigh length of the laser light $L_{in}$ entering the resonator 102 are precisely aligned with the optical path passing through the center of the resonator 102, but means that the beam waist diameter and the Rayleigh length of the laser light $L_{in}$ entering the resonator 102 are roughly aligned with the beam waist diameter and Rayleigh length defined by the resonator 102, such that change in the beam diameter relative to the propagation direction of the beam becomes the same.

The first optical system 17 functions as a transverse mode matching method and is adjusted so that the beam waist diameter and the Rayleigh length of the laser light $L_{in}$ injected into the resonator 102 are roughly aligned with the beam waist diameter and the Rayleigh length defined by the resonator 102.

The second optical system 18 controls the incident angle θ of the laser light $L_{in}$ to the resonator 102. For the second optical system 18, a mirror, a reflector, or the like, can be employed. The incident angle θ to the resonator 102 is the entrance angle of the laser light $L_{in}$ with respect to the optical axis of the resonator 102 or the axis connecting the centers of first mirror 11 and second mirror 12. By adjusting the incident angle θ, the number of times the laser light is folded inside the resonator 102 can be changed.

The laser light $L_{in}$, which has the lateral mode adjusted in the first optical system 17, is guided into the resonator 102 by the second optical system 18 at a predetermined incident angle θ. The laser light $L_{in}$ contains one or more frequency components. For example, a pump light with a wavelength of 800 nm and a signal light with a wavelength of 1200 nm may be contained.

The light injected into the resonator 102 is reflected at the incident mirror, for example, at the concave surface 121 of the second mirror 12, and in a state with a tightly focused beam diameter, the light passes through the nonlinear optical medium 13 in a state with a tightly focused beam diameter and is incident on the concave surface 111 of the first mirror 11. The light reflected at the concave surface 111 is, in a state with a tightly focused beam diameter, again passes through the nonlinear optical medium 13 and is reflected at the concave surface 121 of the second mirror 12. As the light interacts with the nonlinear optical medium 13, a new frequency component is generated.

It is desirable that the multiple frequency components contained in the incident laser light and the frequency components newly generated in the non-linear optical medium 13 all differ by equal to or greater than 10 THz from each other. By making a difference of equal to or greater than 10 THz among all the frequency components involved in the nonlinear optical process, the output light $L_{out}$ has discrete spectra with spacings of equal to or greater than 10 THz.

By folding the light N times (where N is an integer of 1 or greater) within the resonator 102, it is possible to extend the interaction length or the Rayleigh length even if the beam waist is tightly focused inside the nonlinear optical medium 13. In the process of the light being folded back and forth within the resonator 102, a portion of the light can be outcoupled from the resonator 102 as a monitor light $L_{mo}$ through a light-transmissive part 105 to monitor the light intensity.

The light folded N times inside the resonator 102 is outcoupled from the resonator 102 as an output light $L_{out}$. The output light $L_{out}$ contains all the frequency components involved in the nonlinear optical process, resulting in discrete spectra with intervals of 10 THz or greater. The effective optical thicknesses t of the dispersive media 16 have been determined by taking into account the effects of dispersion caused by the first light-transmissive part 151 and the second light-transmissive part 152, and the effects of dispersion caused by reflections. Therefore, the relative phase relationships among all the frequency components contained in the output light $L_{out}$ satisfy the desired phase relationship.

Figure 3A:
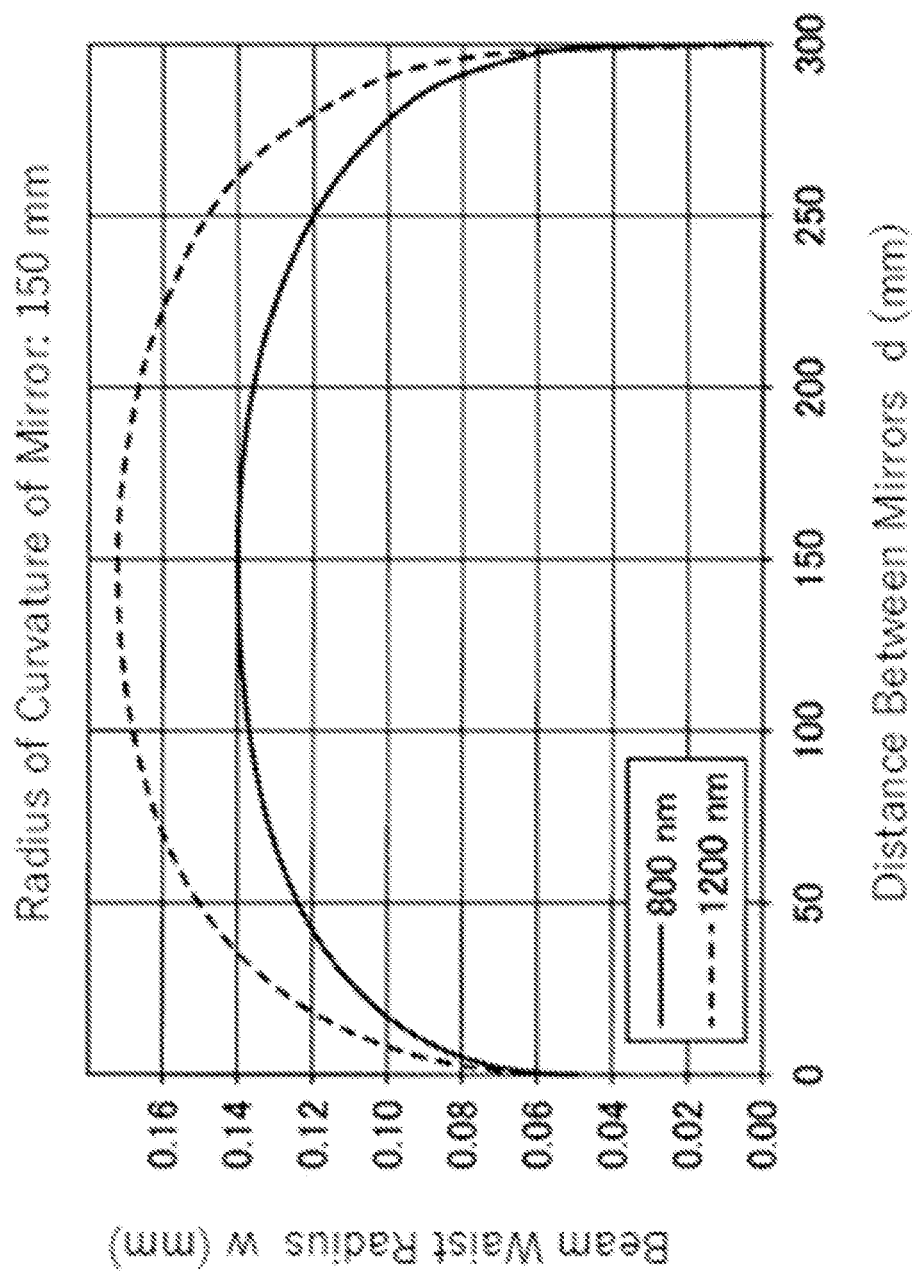
FIG. 3A is a plot of a beam waist radius, with which light returns to a same diameter when the light is folded back, relative to a distance between mirrors that constitute a resonator.
Figure 3B:
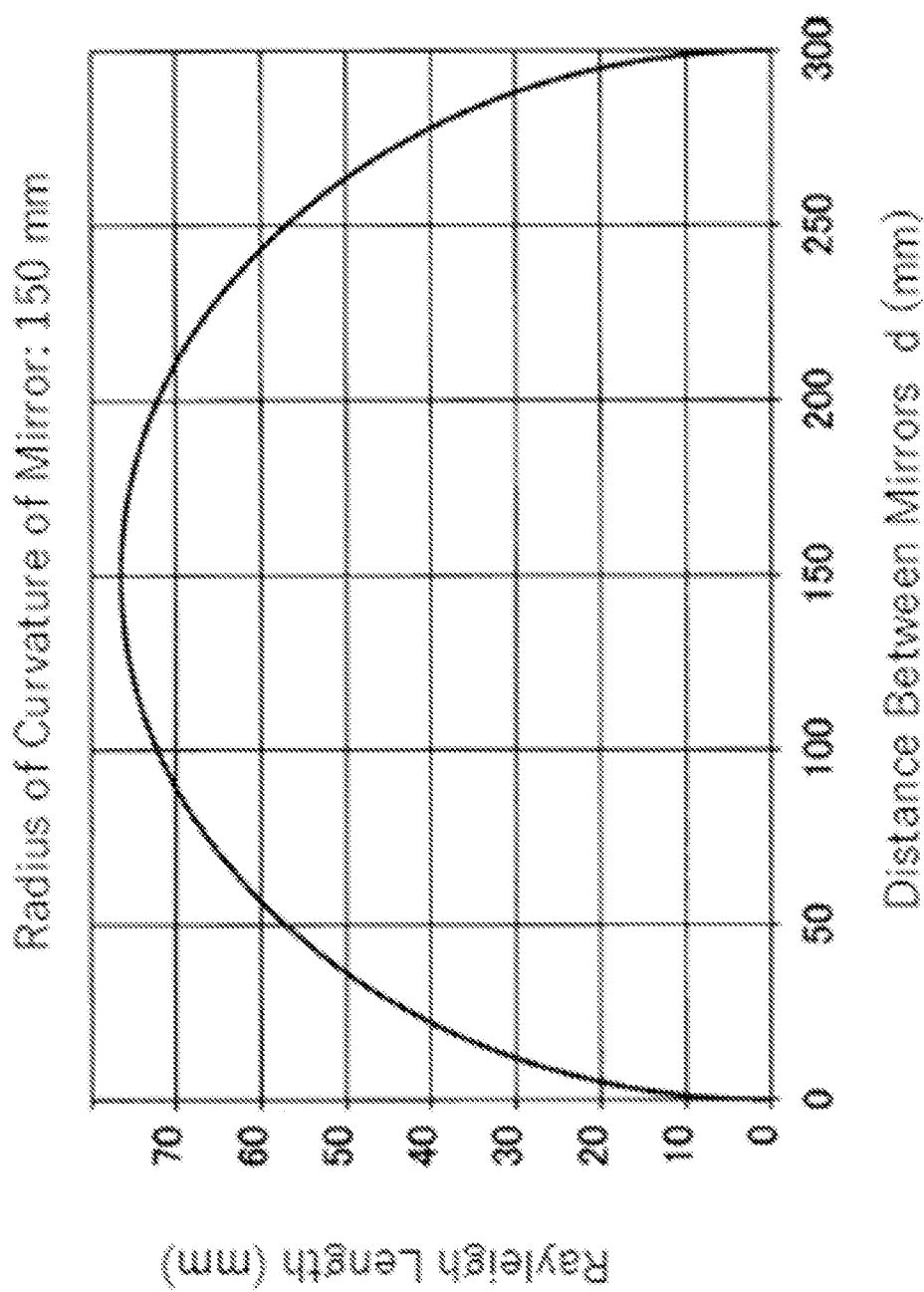
FIG. 3B is a plot of a Rayleigh length, with which light returns to the same diameter when the light is folded back, relative to the distance between the mirrors that constitutes the resonator.

FIG. 3A is a plot of the beam waist radius (w), with which light returns to the same diameter when the light is folded back, relative to the distance d between the mirrors that constitute the resonator 102. The dotted line indicates the converging characteristics of light with a wavelength of 1200 nm, and the solid line indicates the conversing characteristics of light with a wavelength of 800 nm. FIG. 3B is a plot of the Rayleigh length, with which light returns to the same diameter when the light is folded back, relative to the distance d between the mirrors that constitutes the resonator 102. Rayleigh length is the distance from the beam waist when the cross-sectional area of the beam is twice the cross-sectional area of the beam waist, and where dispersion of the beam can be negligible.

In FIG. 3A and FIG. 3B, the concave surface 111 of the first mirror 11 and the concave surface 121 of the second mirror 12 have a curvature radius of 150 mm and the wavelength of the pump light contained in the incident laser light is 800 mu. From FIG. 3A and FIG. 3B, it is found that changing the distance d between the mirrors allows for controlling the beam waist radius (or diameter) and the Rayleigh length.

In the arrangement configuration shown in FIG. 1, by setting the distance d between the mirrors close to 300 mm, the beam diameter at the converging position can be focused to 0.12 mm (where the beam waist radius can be focused to 0.06 mm).

In a typical configuration where folding does not occur, the beam diameter is often in a range of 0.3 to 0.4 mm, due to the balance between the Rayleigh length. In comparison, by adopting the configuration according to the present embodiment, the beam radius can be narrowed to about ⅓ of the typical configuration and thus the beam cross-sectional area can be reduced to about ⅑. In other words, the light density at the beam waist can be increased by approximately nine times greater.

The Rayleigh length $Z_R$ at wavelength λ can be expressed as $Z_R = \pi w2/\lambda$, where w is a beam waist radius. With a cross-sectional area reduced to ⅑, the Rayleigh length $Z_R$ will also be reduced to ⅑, but by folding the beam nine times in the configuration according to the present embodiment, the interaction length equivalent to that of the typical configuration without folding can be obtained. In other words, with a pulse energy approximately one digit lower, the same effect as a typical configuration without folding can be obtained.

Figure 4:
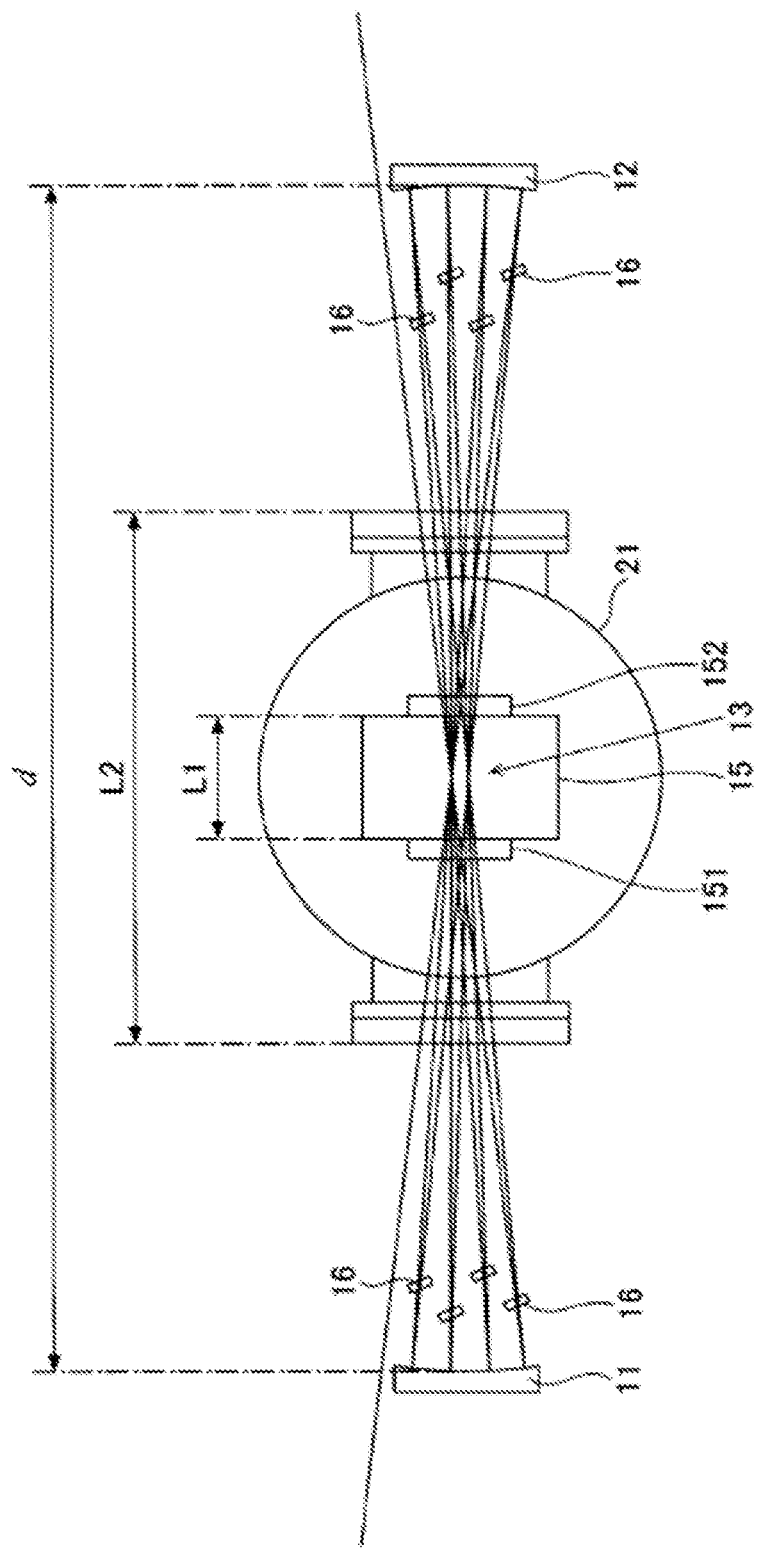
FIG. 4 is a diagram illustrating a layout example of the mirrors and chamber when the light is folded N times (N=9)

FIG. 4 shows an example of the specific arrangement of laser device 10 when the laser light is folded nine times. Based on the results shown in FIG. 3A and FIG. 3B, when a pump light with a wavelength of 800 nm is injected, the distance d between the first mirror 11 and the second mirror 12 is set to 297.3 mm. At the distance d between the mirrors of 297.3 mm, the diameter of the beam waist is 0.12 mm and Rayleigh length is 14 mm. The length L1 of the container 15 in the optical axis direction can be set to 30 mm. Light injected into the nonlinear optical medium 13 in the container 15 through the first light-transmissive part 151 or the second light-transmissive part 152 interacts with the nonlinear optical medium 13, with increased peak intensity before it diffuses.

In the example shown in FIG. 4, the entire container 15 is located in a vacuum chamber 21. By creating a vacuum near the container 15 where the beam is tightly focused, the container 15 can be thermally insulated and occurrence of air discharge can also be prevented. The length L2 of the vacuum chamber 21 in the optical axis direction is, for example, 132 mm. In the nine-folded paths, a dispersive medium 16 is arranged at an appropriate angle in each of the eight folding paths, except for the last pass that outputs the laser light.

According to the layout design in FIG. 4, the optical density of the light injected into the resonator 102 is significantly increased at the beam waist position in the non-linear optical medium 13, and the Rayleigh length is multiplied by N (where N is an integer of 1 or greater) with N times of folding, to extend the interaction length.

Figure 5:
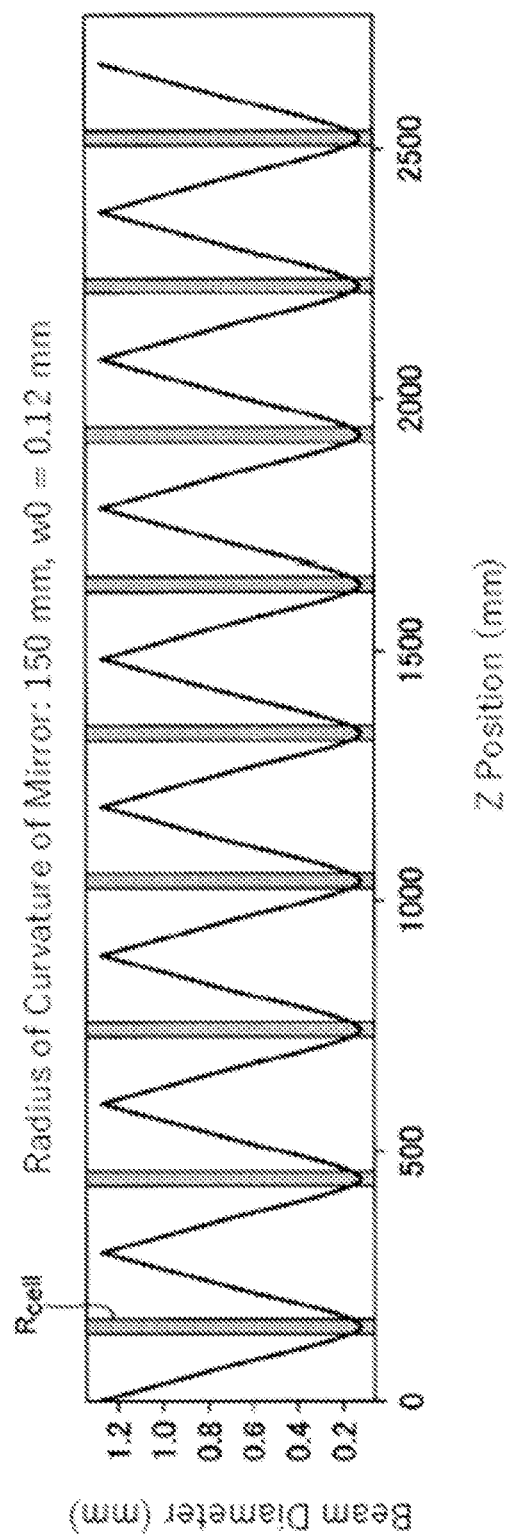
FIG. 5 is a diagram illustrating a change in the beam diameter relative to a propagation direction of the beam in the layout shown in FIG. 4.

FIG. 5 is a diagram illustrating a change in the beam diameter relative to the propagation direction of the beam in the layout shown in FIG. 4. The horizontal axis is the Z position, i.e., the distance in the propagation direction. The vertical axis is the beam diameter. The periodically appearing gray regions correspond to the range $R_{cell}$ covered by the container 15.

The light injected into the resonator 102 is collected by the concave surface 111 of the first mirror 11, or the concave surface 121 of the second mirror 12, and arrives at the point where the beam waist is at its smallest in the container 15. The diameter of the beam waist w0 (w0=2×w) inside the container 15, is 0.12 mm. Each time the light folds back and forth within the resonator 102, the beam diameter returns to the diameter of the incident laser light and no further diffusion occurs. This shows that a stable resonator is formed by the first mirror 11 and the second mirrors 12.

Compared to a typical configuration of an orbital resonator where the beam waist diameter is focused, for example, to 0.3 to 0.4 mm, the light density can be increased by approximately 9 times in the non-linear optical medium 13, such that the same nonlinear optical effect can be achieved with a pulse energy that is approximately one digit lower.

Tightly focusing the diameter of the beam waist reduces the Rayleigh length, but the interaction length can be ensured by setting an appropriate number of folding N within the resonator 102 (N=9 in the example shown in FIG. 5).

While the present invention has been described in terms of the embodiments included herein, the technical scope of the present invention is not limited thereto. The curvature radii of the concave surfaces 111 and 121 of the first and second mirrors 11 and 12 can be set to other than 150 mm, to a practical range to focus the beam waist within the non-linear optical medium 13 located inside the resonator 102, for example, between 100 mm and 200 mm.

The number N of folding times in the resonator 102 can be set to an appropriate number, other than to nine times, to ensure the necessary interaction length that can be obtained by controlling the second optical system 18. The first light-transmissive part 151 and the second light-transmissive part 152 of the container 15 may be angled so that the incident angle of light entering the container 15 is at the Brewster angle to reduce reflection loss. The Brewster angle θb is the angle at which the reflection of the P-polarization is zero and satisfies $\theta b = \tan^{-1}(n_2/n_1)$. Where $n_1$ is the refractive index of light in the medium (for example, air) before entering (for example, air), and $n_2$ is the refractive index of light passing through the first light-transmissive part 151 or the light-transmissive part 152.

Optical loss can be reduced or prevented by placing the first light-transmissive part 151 or the second light-transmissive part 152 at the Brewster angle. Further, the effect of non-point aberration can be reduced by using the first mirror 11 having the concave surface 111 and the second mirror 12 having the concave surface 121.

In the laser device 10 according to the present embodiment, a general-purpose laser diode with low pulse energy and high pulse repetition can be used as its light source 101. Because the average output power is expressed as the product of the pulsed energy and the repetition frequency, even when low energy pulses are injected, the repetition frequency can be increased to increase the average output power.

The laser device 10 according to the present embodiment can be used for wavelength conversion, harmonic generation, photoparametric generation (harmonic generation), and optical parametric amplification (differential frequency generation), caused by nonlinear optical processes, and wavelength shifting caused by Raman scattering. Further, when outputting discrete spectra with an interval of 10 THz or greater, the relative phase relationship between each frequency in the discrete spectrum can be adjusted to the desired phase relationship. For this reason, the laser device 10 is particularly useful in industrial fields such as semiconductor lithography, where high-quality laser oscillation is difficult to obtain directly in the wavelength region, and where high average output power coherent light is required.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A laser device comprising:
   a light source configured to emit a laser light;
   a first mirror and a second mirror constituting a resonator where the laser light emitted from the light source enters;
   a nonlinear optical medium located between the first mirror and the second mirror; and
   a dispersive medium of adjustable effective optical thickness located between the nonlinear optical medium and at least one of the first mirror and the second mirror,
   wherein the laser light passes through the nonlinear optical medium along different optical paths between the first mirror and the second mirror, and is output from the resonator without returning to the different optical paths.

2. The laser device according to claim 1, wherein
   the laser light contains a plurality of frequency components, and
   the plurality of frequency components are different from one another by 10 THz or greater.

3. The laser device according to claim 2, wherein
   the non-linear optical medium is a gaseous medium or a liquid medium, the laser device further comprises a container configured to house the non-linear optical medium, the container comprises a first light-transmissive part located at a first mirror side, and a second light-transmissive part located at a second mirror side, and the laser light propagates:
through the first light-transmissive part, through the nonlinear optical medium, and then through the second light-transmissive part, and
through the second light-transmissive part, through the nonlinear optical medium, and then through the first light-transmissive part.

4. The laser device according to claim 3, wherein the effective optical thickness of the dispersive medium can be adjusted to satisfy a relative phase relationship between the frequency components generated in the nonlinear optical medium, including effects of dispersion caused by the first light-transmissive part and the second light-transmissive part.

5. The laser device according to claim 3, wherein
the laser light is folded N times between the first mirror and the second mirror while the laser light propagates through the nonlinear optical medium before being outputted from the resonator, and
N is an integer of 1 or greater.

6. The laser device according to claim 3, wherein at least one of the first mirror and the second mirror is positionally adjustable to adjust a distance between the first mirror and the second mirror to adjust a beam waist diameter or a Rayleigh length of the laser light propagating through the nonlinear optical medium.

7. The laser device according to claim 3, wherein the first mirror and the second mirror are convex mirrors.

8. The laser device according to claim 3, further comprising a first optical system configured to align a beam waist diameter and a Rayleigh length of the laser light entering into the resonator to a beam waist diameter and a Rayleigh length determined by a configuration of the resonator.

9. The laser device according to claim 8, further comprising a second optical system configured to adjust an incident angle of the laser light entering into the resonator.

10. The laser device according to claim 2, wherein
the laser light is folded N times between the first mirror and the second mirror while the laser light propagates through the nonlinear optical medium before being outputted from the resonator, and
N is an integer of 1 or greater.

11. The laser device according to claim 2, wherein at least one of the first mirror and the second mirror is positionally adjustable to adjust a distance between the first mirror and the second mirror to adjust a beam waist diameter or a Rayleigh length of the laser light propagating through the nonlinear optical medium.

12. The laser device according to claim 2, wherein the first mirror and the second mirror are convex mirrors.

13. The laser device according to claim 2, further comprising a first optical system configured to align a beam waist diameter and a Rayleigh length of the laser light entering into the resonator to a beam waist diameter and a Rayleigh length determined by a configuration of the resonator.

14. The laser device according to claim 13, further comprising a second optical system configured to adjust an incident angle of the laser light entering into the resonator.

15. The laser device according to claim 1, wherein
the laser light is folded N times between the first mirror and the second mirror while the laser light propagates through the nonlinear optical medium before being outputted from the resonator, and
N is an integer of 1 or greater.

16. The laser device according to claim 1, wherein at least one of the first mirror and the second mirror is positionally adjustable to adjust a distance between the first mirror and the second mirror to adjust a beam waist diameter or a Rayleigh length of the laser light propagating through the nonlinear optical medium.

17. The laser device according to claim 1, wherein the first mirror and the second mirror are convex mirrors.

18. The laser device according to claim 1, further comprising a first optical system configured to align a beam waist diameter and a Rayleigh length of the laser light entering into the resonator to a beam waist diameter and a Rayleigh length determined by a configuration of the resonator.

19. The laser device according to claim 18, further comprising a second optical system configured to adjust an incident angle of the laser light entering into the resonator.

20. The laser device according to claim 1, further comprising a an optical system configured to adjust an incident angle of the laser light entering into the resonator.

* * * * *